W. H. HART, Jr.
NECKWEAR FASTENER.
APPLICATION FILED FEB. 3, 1910.
984,428.
Patented Feb. 14, 1911.
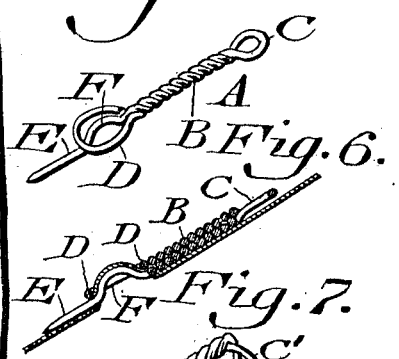
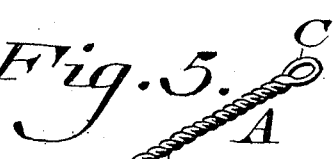

UNITED STATES PATENT OFFICE.

WILLIAM H. HART, JR., OF PHILADELPHIA, PENNSYLVANIA.

NECKWEAR-FASTENER.

984,428.  Specification of Letters Patent.  Patented Feb. 14, 1911.

Application filed February 3, 1910. Serial No. 541,846.

*To all whom it may concern:*

Be it known that I, WILLIAM H. HART, Jr., a citizen of the United States, residing in the city and county of Philadelphia, State of Pennsylvania, have invented a new and useful Neckwear-Fastener, of which the following is a specification.

My invention consists of a fastener for the neck band of an article of neck-wear in the head or knot thereof, the same comprising a twisted shank, a pin, and an eye, and a shoulder on said shank, said pin and eye being adapted to be attached to said head or knot, and the pin projecting for engagement of the neck band therewith, while said shoulder forms a stop and abutment for said band in the adjusted position of the latter.

For the purpose of explaining the invention, the accompanying drawing illustrates a satisfactory reduction of the same to practice, but the important instrumentalities thereof may be varied within the scope of the claims, and so it is to be understood that the invention is not limited to the specific arrangement and organization shown and described.

Figure 1 represents a rear view of a portion of a neck scarf having a fastener embodying my invention in position thereon, the fastener being shown partly dotted. Fig. 2 represents a view of the fastener in full lines in position. Fig. 3 represents a perspective view of the fastener detached. Fig. 4 represents a partial side elevation and partial longitudinal section thereof. Fig. 5 represents a perspective view of a fastener having a shank of greater length than that of the other figures. Fig. 6 represents a longitudinal section on line $x$—$x$, Fig. 1.
Figs. 7 and 8 represent modifications.

Similar letters of reference indicate corresponding parts in the figures.

Referring to the drawings:—A designates a fastener for the neck band of a scarf or similar article of neck-wear in adjusted position on the head or knot thereof, said fastener being composed of a shank B, eyes C, D, the latter being on opposite ends of said shank, the pin portion E, and the hump or deflected portion F. The pin E projects forward of the eye D and has the portion F overhung by the eye D, said portion projecting toward or into the latter.

As a preferred form of construction, the device is formed of a continuous piece of wire bent on itself, the bend being open forming the eye C, and the two lengths twisted for a portion of their length forming the shank B. One end of the piece is turned from the shank into the eye D, and the other end thereof is continuous from the shank under said eye D and beyond the same producing the point portion E, the inner part of which is composed of the hump or deflection F, as above referred to. It will now be seen that the device is placed within the head or knot of the scarf, the pin E passed through the fabric of the same near the side thereof, while the eye C is stitched to the portion of the fabric back of said eye, both ends of the device thus being attached to the head or knot, while the hump forces some of the fabric into the eye D, so as to press it thereagainst, the device thus being connected in position, leaving the pin projecting sufficiently at the relative side for the engagement of the neck band of the scarf therewith, while the wall of the eye D constitutes a shoulder, which is set back from the point of the pin and serves to limit the sliding motion of the band on the pin and constitutes an abutment against which the band is seated, thus properly sustaining the latter in its adjusted position in the head or knot.

Fig. 5 shows the device having a shank longer than in the previous figures, for articles of neck-wear requiring a longer retainer, it being evident that the shank may be made readily of various lengths without affecting the operation of the device, and by simply adjusting the machinery employed for the purpose, while the single eye C, which is formed on the head end of the shank, is sufficient for the purpose of stitching the device to the article of neck-wear.

Fig. 7 represents a perspective view of the device having an eye C′ turned laterally from the shank B thereof.

Fig. 8 represents a perspective view of the device having eyes C² respectively turned in opposite lateral directions from the shank B, but in other respects, the devices are similar to those shown in the other figures, said eyes C² providing means for doubly stitching or securing the same to the article of neckwear.

Having thus described my invention, what I claim as new and desire to secure by Letters Patent, is:—

1. A retainer of the character stated, comprising a shank, an attaching member on one end thereof, and an eye on the opposite end of said shank with a pin projecting from the end of the shank adjacent said eye and having a deflected portion at an angle to said eye and adapted to enter the same to force the fabric into said eye the diameter of said eye being substantially the same as that of the deflected portion to clamp the tie between the said deflected portion and the interior of the eye.

2. A retainer of the character stated composed of a continuous piece of material formed with a twisted shank, an eye at one end of said twisted shank, an open eye at the opposite end of said shank, one terminal of the material constituting a portion of said eye, and a pin continuous of said shank with its point extended beyond the open eye and said pin provided at a point coincident with said open eye with a deflected portion adapted to enter the same, the first-named eye being turned laterally from the shank.

WILLIAM H. HART, Jr.

Witnesses:
JOHN A. WIEDERSHEIM,
WM. CANER WIEDERSEIM.